(12) United States Patent
Schlüssel

(10) Patent No.: US 12,343,831 B2
(45) Date of Patent: Jul. 1, 2025

(54) CLAMPING DEVICE

(71) Applicant: GRESSEL AG, Aadorf (CH)

(72) Inventor: Marcel Schlüssel, Bassersdorf (CH)

(73) Assignee: GRESSEL AG, Aadorf (CH)

( * ) Notice: Subject to any disclaimer, the term of this patent is extended or adjusted under 35 U.S.C. 154(b) by 50 days.

(21) Appl. No.: 18/033,581

(22) PCT Filed: Jan. 24, 2022

(86) PCT No.: PCT/EP2022/051437
§ 371 (c)(1),
(2) Date: Apr. 25, 2023

(87) PCT Pub. No.: WO2022/171418
PCT Pub. Date: Aug. 18, 2022

(65) Prior Publication Data
US 2023/0398647 A1    Dec. 14, 2023

(30) Foreign Application Priority Data

Feb. 10, 2021    (DE) ...................... 10 2021 103 114.1

(51) Int. Cl.
*B23Q 1/00*    (2006.01)
*B23Q 3/06*    (2006.01)

(52) U.S. Cl.
CPC ......... *B23Q 1/0072* (2013.01); *B23Q 1/0018*
(2013.01); *B23Q 3/066* (2013.01)

(58) Field of Classification Search
CPC .. B25B 1/10; B25B 1/24; B25B 11/00; B25B 5/006; B23Q 1/0072; B23Q 1/0018;
(Continued)

(56) References Cited

U.S. PATENT DOCUMENTS

2007/0228671 A1* 10/2007 Norton ................ B23B 31/1071
279/2.11
2021/0016404 A1   1/2021 Ulrich

FOREIGN PATENT DOCUMENTS

DE    3309555 A1    9/1984
DE    4338665 A1    10/1994
(Continued)

OTHER PUBLICATIONS

Machine translation of WO-2019175024-A1 (Year: 2019).*
(Continued)

*Primary Examiner* — Robert F Neibaur
(74) *Attorney, Agent, or Firm* — Paul D. Bianco; Fleit Intellectual Property Law

(57) ABSTRACT

A clamping device includes a zero-point clamping system, which can be actuated by a working medium; a machine vice, which can be coupled to the system; and a gripping and positioning device for transporting and positioning the machine vice on the zero-point clamping system. The zero-point clamping system contains at least one coupling element and the gripping and positioning device contains a docking device having at least one docking element, which can be coupled to the coupling element, for supplying the working medium to the system. To facilitate coupling, the at least one coupling element of the system is offset parallel to a receiving opening for a clamping element on the machine vice, and the at least one docking element is positioned in such a way that it is coupled to the coupling element by retraction of the clamping element located on the machine vice into the receiving opening.

16 Claims, 6 Drawing Sheets

(58) Field of Classification Search
CPC ........ B23Q 1/0063; B23Q 3/06; B23Q 3/066;
B23Q 7/14; B23Q 7/1431; B25J 15/04;
B25J 15/0408; B25J 15/0019; B23B 29/046
USPC .................................................. 269/309, 310
See application file for complete search history.

(56) References Cited

FOREIGN PATENT DOCUMENTS

| | | |
|---|---|---|
| DE | 10 2010 035633 B3 | 11/2011 |
| DE | 20 2012 001539 U1 | 3/2012 |
| DE | 10 2012 014617 B3 | 5/2013 |
| DE | 10 2018 106210 A1 | 9/2019 |
| DE | 10 2018 128883 A1 | 5/2020 |
| EP | 3292951 A1 | 3/2018 |
| EP | 3653333 A1 * | 5/2020 ........... B23Q 1/0018 |
| WO | WO-2019175024 A1 * | 9/2019 ........... B23Q 7/1431 |

OTHER PUBLICATIONS

Machine translation of EP-3653333-A1 (Year: 2020).*
International Search Report and Written Opinion for PCT/EP2022/051437, filed Jan. 24, 2022.
Result of Examination Report for German Application No. 10 2021 103 114.1 dated Feb. 10, 2021.
Office Action dated Jul. 16, 2024 for Japanese Patent Application No. 2023-530936.
International Preliminary Report on Patentability dated Aug. 15, 2023, with Written Opinion, for PCT/EP2022/051437.

* cited by examiner

CLAMPING DEVICE

FIELD OF THE INVENTION

The invention relates to a clamping device.

BACKGROUND

Such a clamping device is known from DE 10 2018 128 883 A1. It has a zero-point clamping system that can be actuated by a working medium, a machine vice that can be coupled to the zero-point clamping system via a pallet, and a gripping and positioning device designed as a pallet gripper for transporting and positioning the pallet equipped with the machine vice on the zero-point clamping system. In order to be able to supply the zero-point clamping system with the working medium via the pallet gripper, a docking unit is integrated in the plate gripper, which can dock onto a clamping system for the pallet. The zero-point clamping system includes a plurality of zero-point clamping devices integrated in a plate, each of which has a receiving opening for receiving a clamping pin that projects from the underside of the pallet. A plurality of coupling elements arranged side by side are provided on a side wall of the plate for coupling with corresponding docking elements in the docking unit arranged on the pallet gripper. Via the coupling elements, a working medium can be supplied to the zero-point clamping system for actuating the zero-point clamping devices. The coupling elements are arranged on the side wall of the pallet in such a way that their longitudinal axes are aligned at right angle to the longitudinal axes of the receiving openings for the clamping spigots. The pallet with the machine vice arranged on it can be placed onto the plate of the zero-point clamping system by the pallet gripper. In order to couple the docking unit arranged on the pallet gripper to the coupling elements arranged on the zero-point clamping system, the docking unit must first be lowered relative to the plate gripper in order to vertically align the docking elements in the docking unit relative to the coupling elements in the zero-point clamping system. After this vertical alignment, the docking unit must then be extended horizontally in a next step in order to lock the docking unit to the plate of the zero-point clamping system and to connect the docking elements to the coupling elements. Corresponding linear guides and separate drives are required for this purpose.

SUMMARY OF THE INVENTION

One aspect of the invention relates to a clamping device, which enables coupling of a docking unit to supply the zero-point clamping system with a working medium without separate drives on the docking unit.

Embodiments of such a clamping device are disclosed herein. Appropriate embodiments and advantageous refinements of the invention are also disclosed herein.

The zero-point clamping system in the clamping device according to the invention has at least one coupling element, and the gripping and positioning device has a docking device with at least one docking element that can be coupled to the coupling element for supplying working the medium to the zero-point clamping system. The at least one coupling element on the zero-point clamping system is offset parallel to a receiving opening for a clamping element arranged on the machine vice, and the at least one docking element is arranged in such a way that it is coupled to the coupling element through a retraction movement of the clamping element arranged on the machine vice into the receiving position. A key advantage of the clamping device according to the invention is that the coupling of the coupling elements provided for the supply of a working medium also occurs without additional drives and intricate coupling movements merely by the coupling of the machine vice to the zero-point clamping system initiated by the gripping and positioning device.

In a particularly preferred embodiment, the coupling and docking elements that can be coupled together are designed as fluid transfer elements for transferring compressed air or hydraulic fluid as the working medium. The coupling element expediently contains a through-opening, the longitudinal axis of which runs parallel to a longitudinal axis of the receiving opening for the clamping element. A blocking element, which is acted upon by a compression spring into a closed position, can be arranged in the through-opening of the coupling element. The coupling and docking elements that can be coupled together can be designed as fluid transmission elements and/or as electrical connectors for transmitting electrical energy or electrical signals. The electrical connectors can also be designed as connection elements for contactless transmission.

The at least one docking element can include a pressure ram that is axially displaceable into a receiving opening of the docking unit and provided with a through-opening. The pressure ram is arranged in such a way that its through-opening is aligned with the through-opening of the corresponding coupling element when the gripping and positioning device assumes a docking position for docking the machine vice onto the zero-point clamping system. The pressure ram can be pressed outwardly by a compression spring and expediently has a central pressure part on its outer end facing the coupling element for opening the blocking element arranged in the connecting part and a passage for conveying compressed air from the docking element to the coupling element. The blocking element can be a blocking pin guided to move within the coupling element and forced into a closed position by a compression spring.

In order to facilitate decoupling, the pressure ram expediently has a first pressure surface which can be acted upon by the working medium to move the pressure ram into a retracted position. This enables the gripping and positioning device to be moved away for decoupling at an angle of 90° to the center axis of the zero-point clamping system. In a further advantageous manner, the pressure ram can be designed as a differential pressure ram, which, in addition to the first pressure surface that can be acted upon by the working medium to move the pressure ram into a retracted position, contains a second pressure surface that can be acted upon by the working medium to force the pressure ram into an extended position. This enables the pressure ram to be pressed by the working medium against the coupling element and also to be retracted. A plurality of switching valves are expediently arranged in the docking unit for controlling the supply of compressed air. A self-locking valve can be arranged in the zero-point clamping system with a spring-biased closure mechanism to hold the zero-point clamping system in an open position.

In a particularly advantageous embodiment, a plurality of rows of first coupling elements arranged side by side are arranged on the zero-point clamping system, and a plurality of docking elements arranged side by side are arranged on the gripping and positioning device for coupling with the corresponding coupling elements of each row. This allows machine vices of different lengths to also be supplied with a working medium without intricate adjustment mechanisms. The coupling elements can be arranged in a grid with prescribed divisions and spacings adjusted to the different machine vices. This grid can be adapted to the specific dimensions and requirements.

In another advantageous embodiment, the gripping and positioning device can have an integrated drive to move the clamping device between a clamped and released position, in addition to a coupling device for releasable connection to a clamping device and for fixed holding of the clamping device during transport. Such a gripping and positioning device thus can not only transport a clamping device back and forth between different positions, for example, between a deposit position and a machining position within a machine tool, but can also actuate the clamping device in the different positions for movement between a clamped and released position. The gripping and positioning device therefore makes it possible for a conventional clamping device to be used not only for holding a workpiece during machining, but also as a gripping device for transporting and handling workpieces. This results in a simplified loading process and shorter setup and downtimes. Changeover and retooling operations can also take place outside of the machine room.

BRIEF DESCRIPTION OF THE DRAWINGS

Additional details and advantages of the invention will be apparent from the following description of a preferred embodiment example with reference to the drawing. In the drawing.

DETAILED DESCRIPTION

Figure 1:
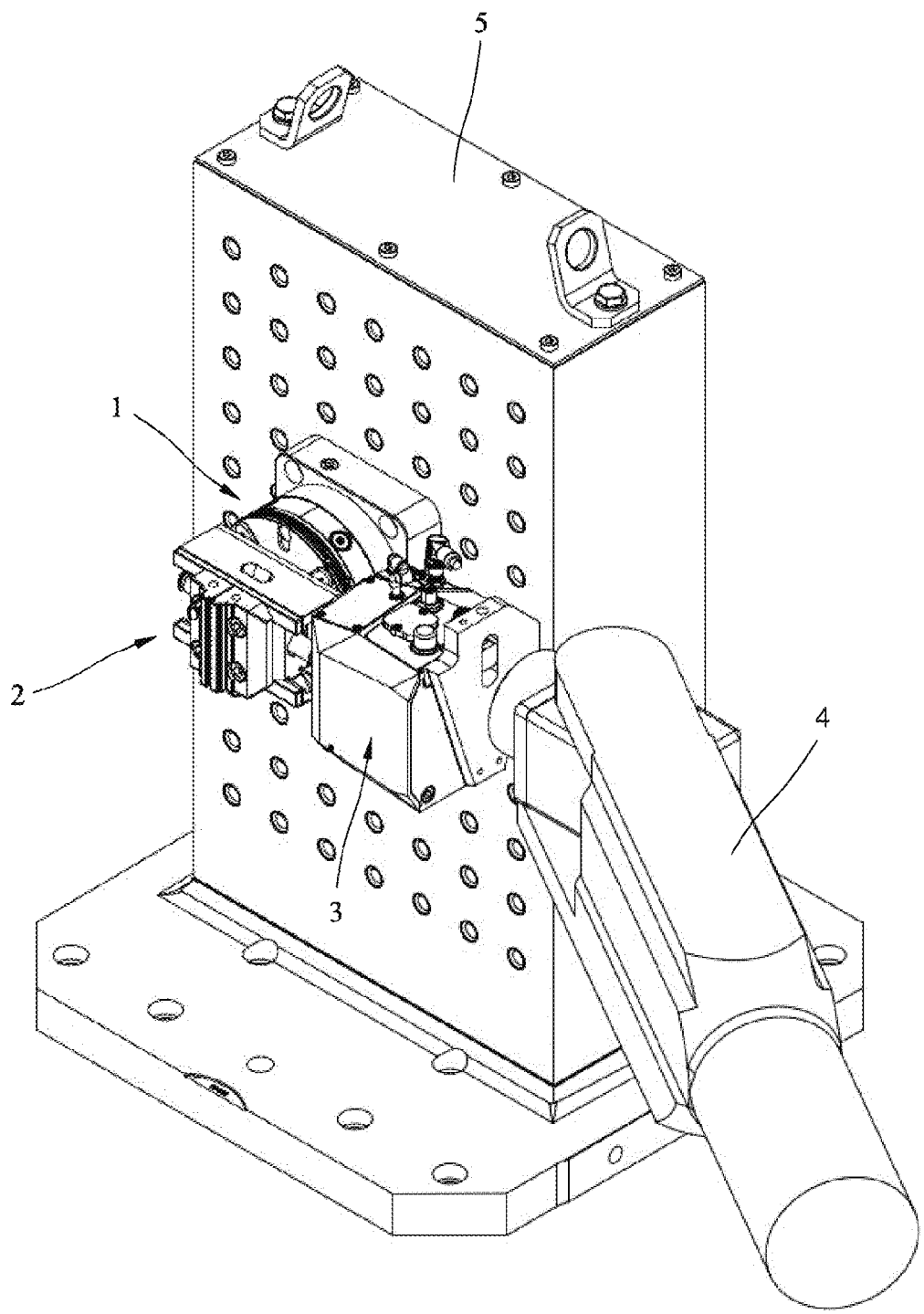
FIG. 1 shows a clamping device with a zero-point clamping system, a machine vice and a gripping and positioning device in a perspective view.

FIG. 1 shows a clamping device designed for clamping workpieces for machining, which includes a zero-point clamping system 1; a machine vice 2, which can be coupled to the zero-point clamping system 1; and a gripping and positioning device 3, which can be detachably connected to the machine vice 2 for transporting and positioning the machine vice 2 on the zero-point clamping system 1. The gripping and positioning device 3 can be coupled to the machine vice 2 for its transport between different positions. In the embodiment example shown, the gripping and positioning device 3, which can be coupled to the machine vice 2, is mounted on a support arm 4, which can be moved in a plurality of axes of a robot designed as an articulated arm robot. However, the gripping and positioning device 3 can also be arranged on a gantry robot or a differently designed transport or positioning system for moving the machine vice 2 in different directions. In the embodiment shown, the zero-point clamping system 1 is designed as a separate assembly, which can be fastened to a clamping table or a clamping carrier 5 that is here vertically aligned. However, the zero-point clamping system 1 can also be integrated in a clamping table or workpiece table of a machine tool.

Figure 2:
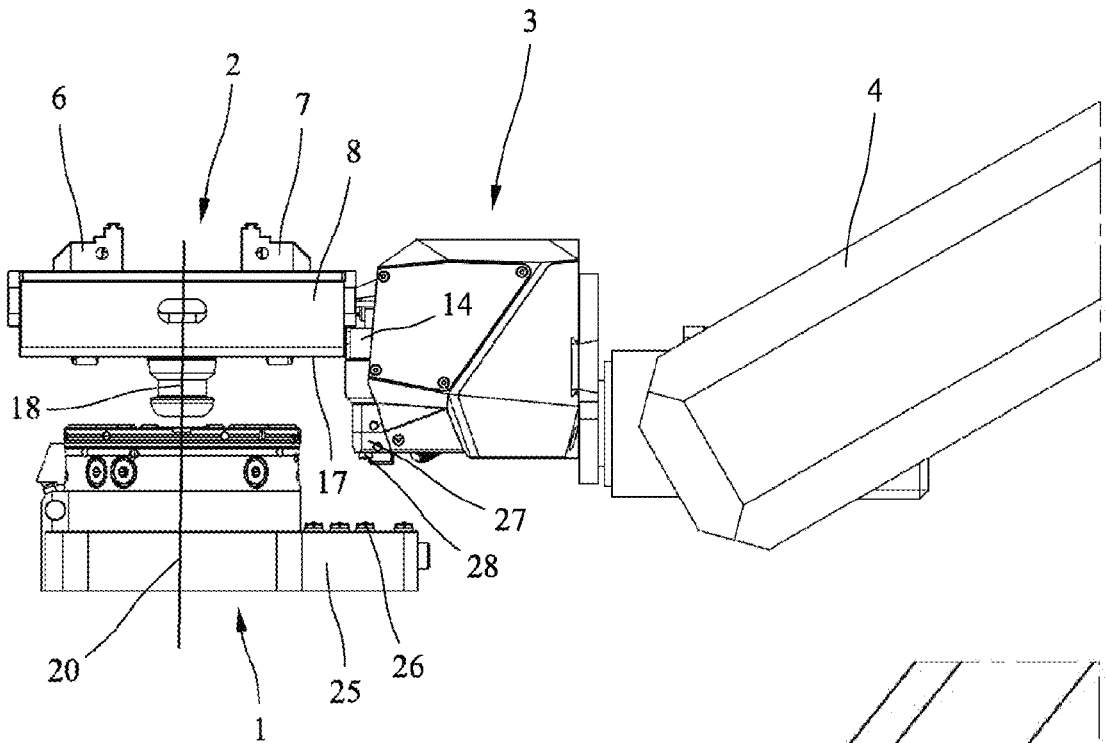
FIG. 2 shows the clamping device depicted in FIG. 1 in a side view.
Figure 3:
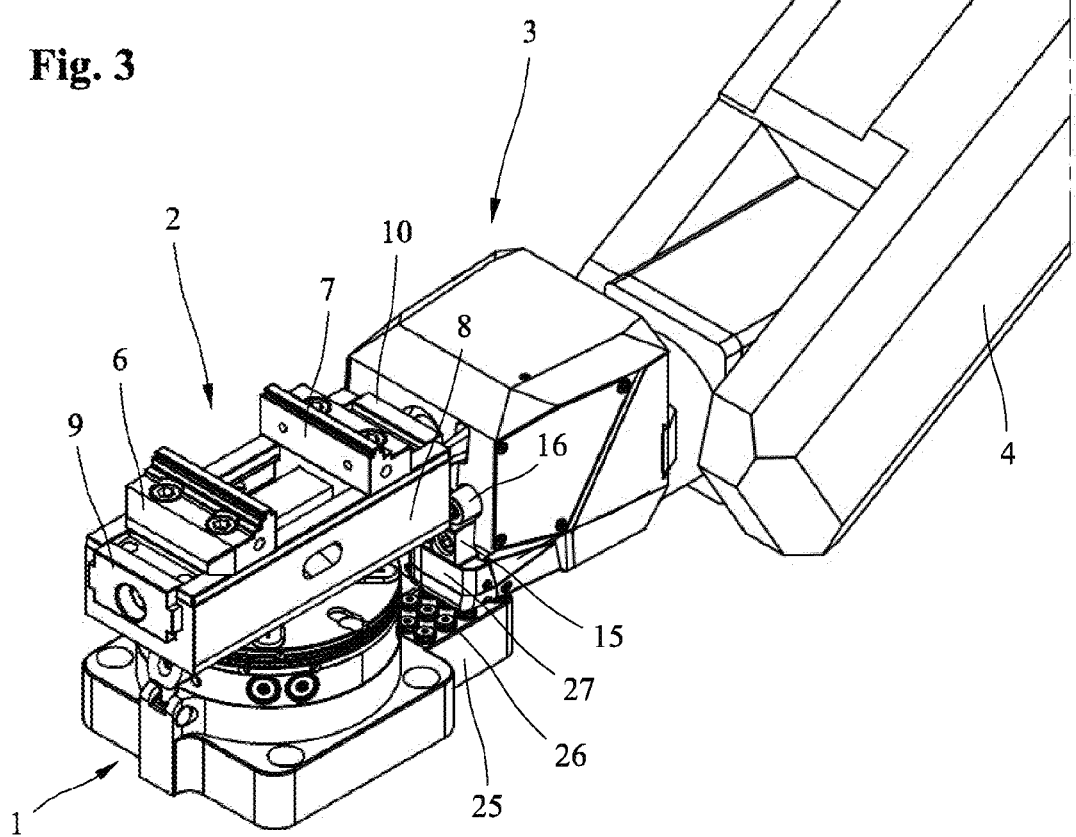
FIG. 3 shows the clamping device depicted in FIG. 1 in an enlarged perspective view.
Figure 4:
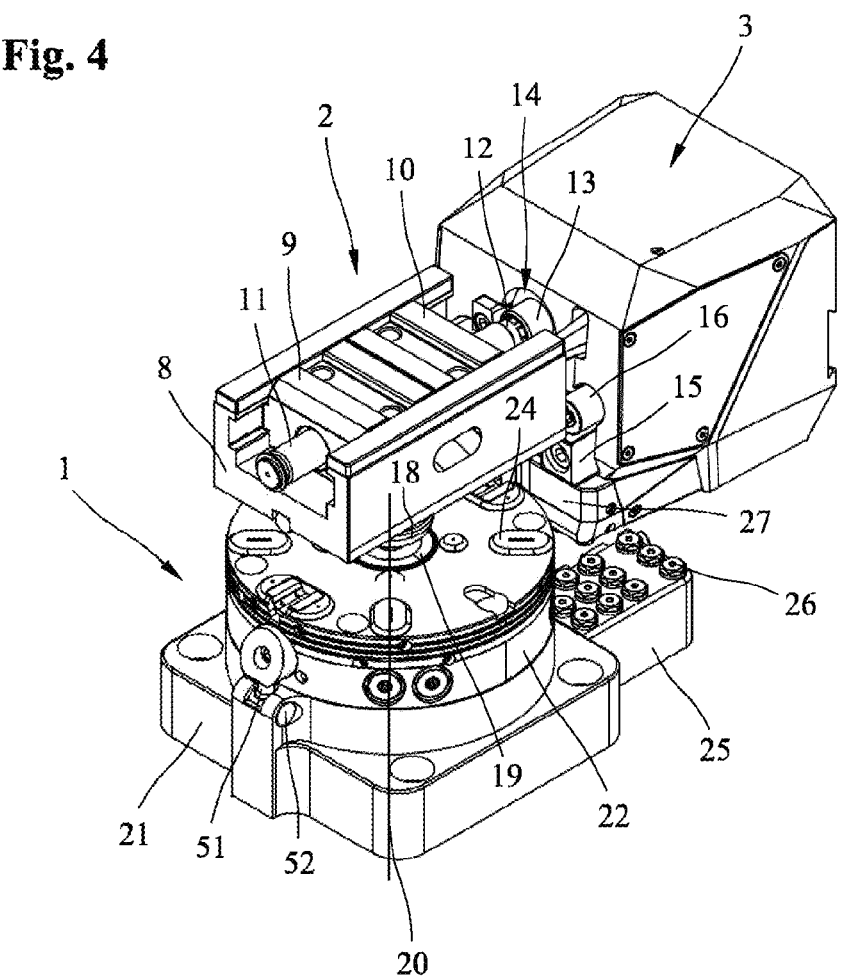
FIG. 4 shows a detail view of the clamping device depicted in FIG. 1.

The machine vice 2, shown in more detail in FIGS. 2 to 4, is designed as a centering vice with two clamping jaws 6 and 7 that can be adjusted relative to each other. However, it can also have one fixed and one movable clamping jaw or be designed or as a multiple clamping device with more than two clamping jaws. In the embodiment example shown, the machine vice 2 contains a base element 8 on which the two clamping jaws 6 and 7 are guided to move over slides 9 and 10 shown in FIG. 4 and are oppositely adjustable by an adjustment mechanism with an adjustment element 11 designed here as an adjusting spindle.

As can be seen from FIG. 4, the adjustment element 11, which is in the form of an adjusting spindle, has on its free end a coupling profile 12, e.g., in the form of an external hexagon, for coupling to a corresponding coupling piece 14 of a drive 13 integrated in the gripping and positioning device 3. The gripping and positioning device 3 also contains on its front side a coupling unit 15 for positive coupling with the base element 8 of the machine vice 2. Via coupling unit 15, the machine vice 2 can be gripped by the gripping and positioning device 3 and transported to a desired position. The coupling unit 15 is designed in such a way that it cannot only grip the machine vice 2, but also hold it securely during transport and therefore also transport it safely to the zero-point clamping system 1, e.g., in any position. An RFID write/read head 16 and various sensors are also arranged on the front side of the gripping and positioning device 3 to monitor locking, detect distance, and check the presence of the machine vice 2.

Because of the rotary drive 13 integrated in the gripping and positioning device 3, the adjustment element 11 designed as an adjustment spindle can be rotated for mutual adjustment of the two clamping jaws 6 and 7. The machine vice 2 can thus not only be transported via the gripping and positioning device 3, but also clamped and released. Therefore, the machine vice 2 can not only be used for clamping during machining, but also for gripping a workpiece for transport prior to machining. Instead of the coupling profile 12, which is designed as an external hexagon, other coupling solutions can also be used, such as splined shafts, claw attachments, four-edge connections or shafts with trunnion attachments. The rotary drive 13 is designed in such a way that it is coupled to the adjustment element 11, which is designed as an adjustment spindle, during the coupling of the gripping and positioning device 3 to the machine vice 2. One possible design of the gripping and positioning device for transport and operation of the machine vice 2 is disclosed in DE 10 2018 106 210 A1. Explicit reference is made to the content of the disclosure with regard to the design and operating mode of the gripping and positioning device.

Figure 5:
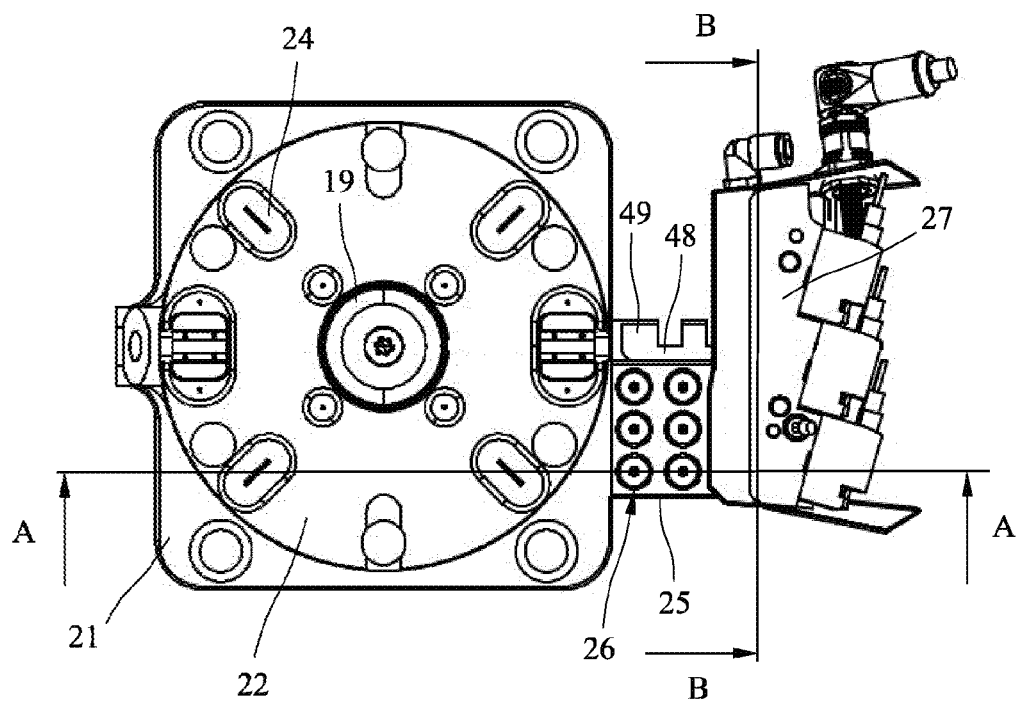
FIG. 5 shows a top view of the zero-point clamping system of the clamping device depicted in FIG. 1.

A zero-point clamping element 18 projecting at right angles from the underside 17 of the base element 8 of the machine vice 2 is provided for lockable engagement in a receiving opening 19 of the zero-point clamping system 1 shown in FIGS. 4 and 5. Via the zero-point clamping element 18, which is designed here as a clamping spigot, the machine vice 2 can be centered and placed in a centered and accurately positioned manner on a machine table of a machine tool provided with a corresponding zero-point clamping system 1 and clamped by an appropriate clamping device. For this purpose, the machine vice 2 is moved by the gripping and positioning device 3 in such a way that the zero-point clamping element 18, which is designed here as a single clamping spigot moves along a longitudinal axis 20 of the receiving opening 19 in the zero-point clamping system 1 and engages in the receiving opening 19 in the zero-point clamping system 1 for subsequent clamping. In the embodiment shown, only one zero-point clamping element 18 designed as a clamping spigot is arranged on the machine vice 2. However, a plurality of zero-point clamping elements acting as centering and clamping elements can also be provided on the machine vice 2 for engagement in corresponding receiving openings of a zero-point clamping system.

Figure 6:
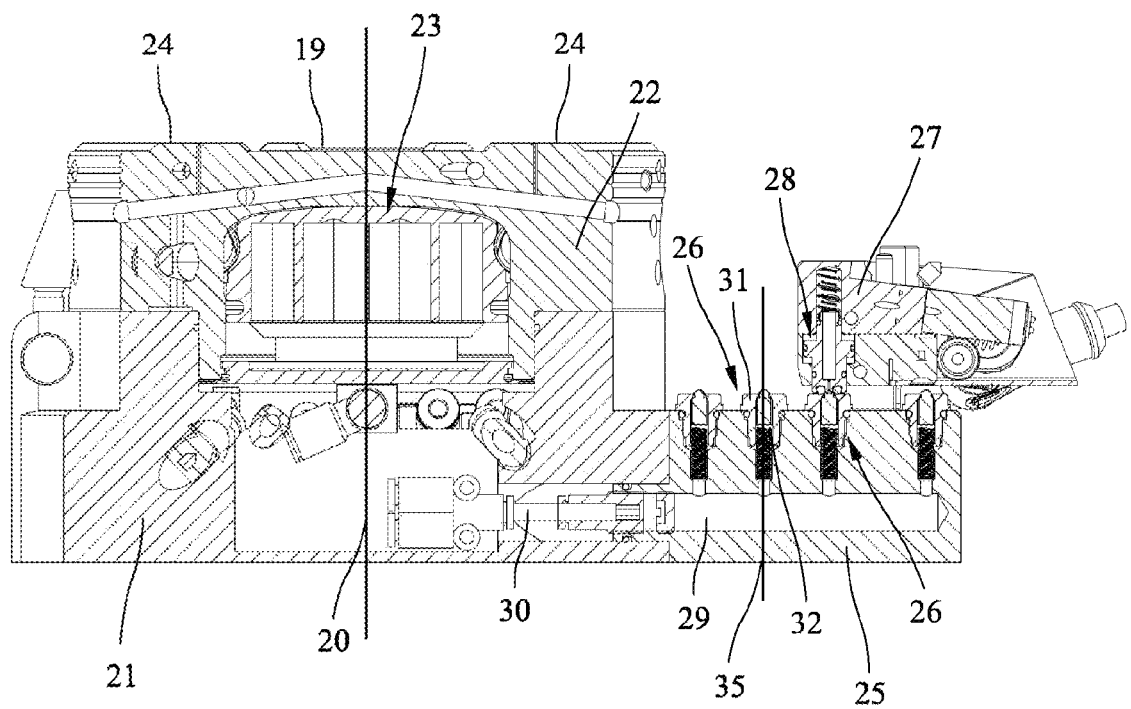
FIG. 6 shows a sectional view along line A-A of FIG. 5.

The zero-point clamping system 1, which is designed in the embodiment shown as a separate zero-point clamping module, contains a pot-shaped housing 22 arranged on a base plate 21, in which the receiving opening 19 for the zero-point clamping element 18 and a clamping device 23, shown in FIG. 6, for clamping of the machine vice 2 via the zero-point clamping element 18, designed as a clamping spigot, are arranged. The housing 22 has on its upper side a plurality of flat contact surfaces 24 arranged around the central receiving opening 19 for supporting the machine vice 2. A block-like connection unit 25 is also provided on the zero-point clamping system 1 with a plurality of first coupling elements 26 arranged parallel to the receiving opening 19.

A docking device 27, which can be coupled to the connection unit 25, is arranged on the gripping and positioning device 3 with a plurality of docking elements 28, which can be coupled to the coupling elements 26, for supplying the zero-point clamping system 1 with a working medium. The coupling elements 26 on the zero-point clamping system 1 and the corresponding docking elements 28 form an interface via which an energy supply to the zero-point clamping system 1 can be achieved, even without special provisions in a work table. In the embodiment example shown, the clamping device 23 is pneumatically actuated in such a way that the zero-point clamping system 1 is supplied with compressed air as the working medium. The compressed air fed into the zero-point clamping system 1 via the gripping and positioning device 3 can not only be used to actuate the clamping device 23, but the compressed air can also be used as blowing air for removing swarf or any other contaminants. In the case of hydraulic or electrical clamping systems, however, a hydraulic fluid or electrical current can also be supplied to the zero-point clamping system as a working medium via the gripping and positioning device, provided the coupling elements are designed accordingly.

The clamping device 23 can be constructed in such a way that it is closed by spring bias and can be opened by compressed air. However, the compressed air fed to the zero-point clamping system 1 can not only open the clamping device 23, but the compressed air can also be used to intensify the clamping force generated by the spring bias. Moreover, the compressed air can also be used to realize blow-off or cleaning functions. Control functions implemented by sensors and dynamic pressure queries can also be implemented by the compressed air.

In the embodiment shown, a plurality of rows of coupling elements 26 arranged side by side are provided on the connection unit 25 of the zero-point clamping system 1. The docking device 27 of the gripping and positioning device 3 also has a plurality of docking elements 28 arranged side by side for coupling with the corresponding coupling elements 26 of each row. In this way, machine vices 2 of different lengths can also be connected. The coupling elements 26 arranged in the connection unit 25 are connected to the clamping device 23 via channels 29 and lines 30. The docking elements 28 arranged in the docking device 27 are supplied with compressed air via an appropriate connection. In the embodiment shown, four rows spaced apart from one another are provided on the zero-point clamping system 1, each with three coupling elements 26 arranged side by side, and three docking elements 28 arranged side by side on docking device 27 of the gripping and positioning device 3 are provided for coupling with the coupling elements 26 of each row. Depending on the requirements, other grids or divisions are also possible.

Figure 7:
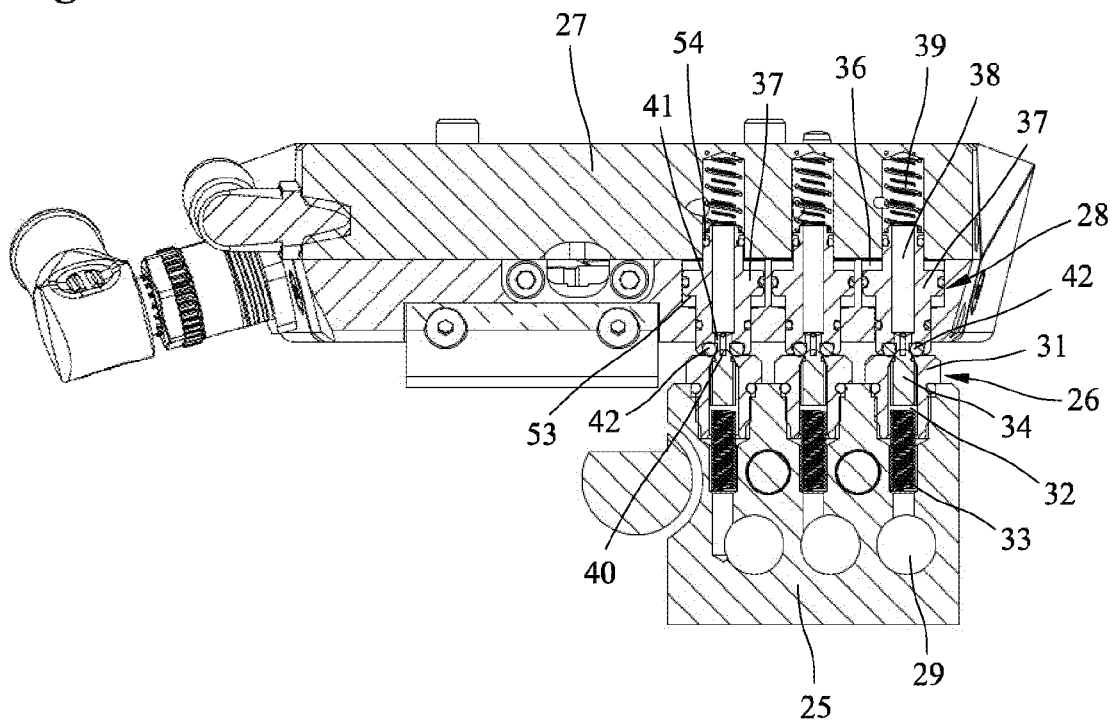
FIG. 7 shows a sectional view along line B-B of FIG. 5.

As can be seen in particular from FIG. 7, the coupling elements 26 arranged in the connection unit 25 of the zero-point clamping system 1 have a bushing-shaped connection part 31 screwed into the connection unit 25 with a through-opening 32 and a blocking element 34 arranged to move in the through-opening 32 and biased by a compression spring 33 in a closing direction. In the embodiment shown, the blocking element 34 is designed as a blocking pin. The coupling elements 26 are arranged according to FIG. 6 in such a way that the longitudinal axes 35 of the through-openings 32 in the connection parts 31 run parallel to the longitudinal axis 20 of the receiving opening 19 for the clamping element 18.

It can also be seen in FIG. 7 that the docking elements 28 arranged in the docking device 27 contain a pressure ram 37 that is axially displaceable in a receiving opening 36. The pressure ram 37 has a through-opening 38 and is pressed outwardly by a spring 39. The pressure rams 37 of the docking elements 28 are arranged in such a way that their through-openings 38 are aligned with the corresponding through-openings 32 of the coupling elements 26 when the gripping and positioning device 3 assumes a docking position for docking the machine vice 2 to the zero-point clamping system 1. The coupling elements 26 and the docking elements 28 are therefore coupled to each other for compressed air supply to the zero-point clamping system 1 when the zero-point clamping element 18, which is designed as a clamping pin on the machine vice 2, is retracted into the receiving opening 19 of the zero-point clamping system 1. No separate drives are required for coupling the compressed air supply.

On their outer end facing the coupling element 26, the pressure rams 37 have a central pressure part 40 for opening the pin-like blocking element 34 and a nozzle-like passage 41 to convey the compressed air from the through-opening 38 in pressure ram 37 to the through-opening 32 in connection part 31. A seal 42 is arranged on the outer end of the pressure ram 37 for sealed connection of the pressure ram 37 with the connection part 31 of the coupling element 26.

Figure 8:
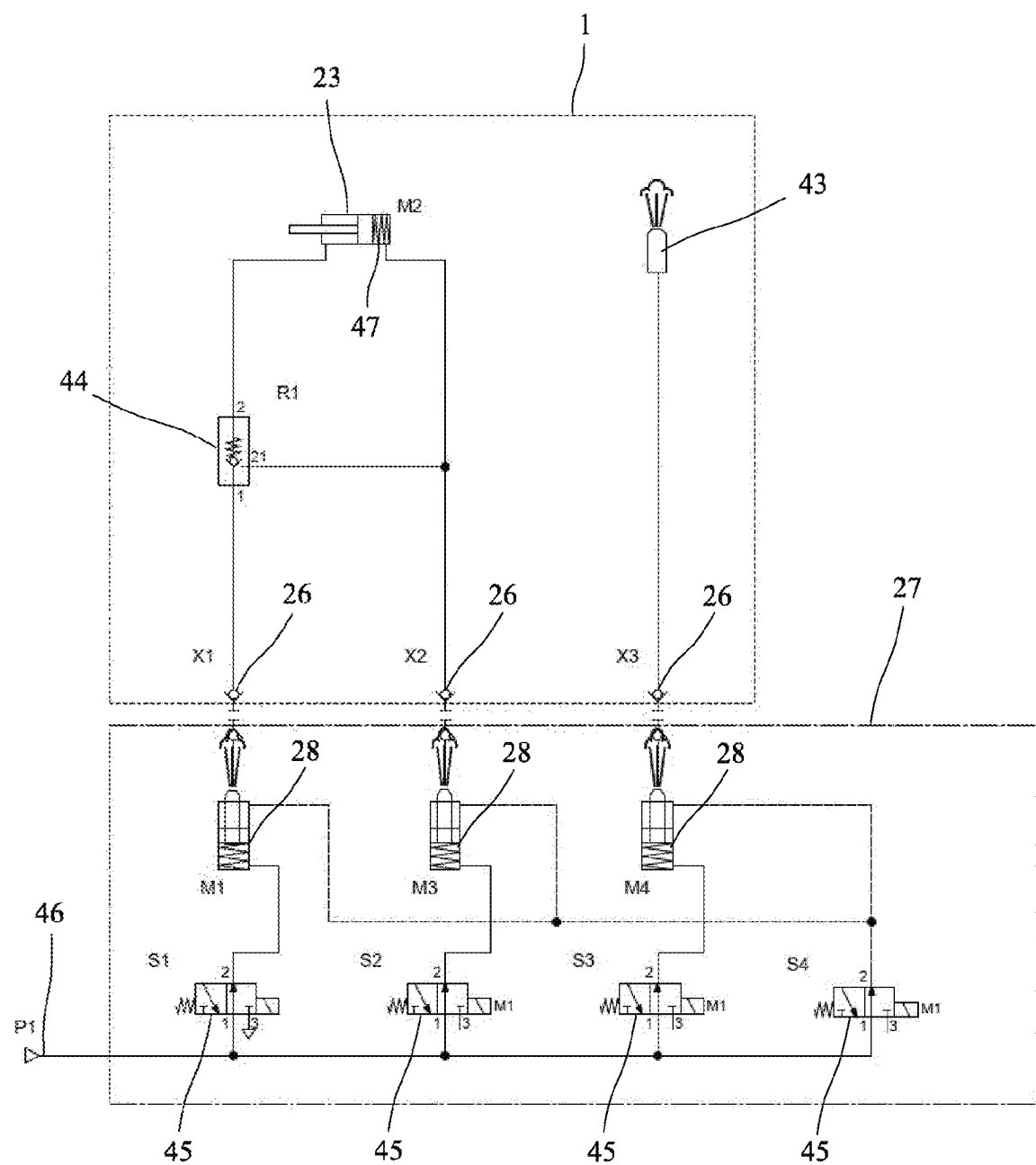
FIG. 8 shows a circuit diagram for control of the zero-point clamping system and FIG. 9 shows the clamping device with the sensor mechanism to monitor the switching state of the zero-point clamping system.

FIG. 8 shows a circuit diagram for pneumatic control of the zero-point clamping system 1 via the docking device 27. This circuit diagram shows the clamping device 23 designated M2 on the zero-point clamping system 1, a schematically depicted blowing device 43 for blow-off of swarf or other contaminants, a self-locking valve 44 and three coupling elements 26 designated X1 to X3. Three docking elements 28 denoted M1, M3 and M4 and four switching valves 45 denoted S1 to S4 are shown on the docking device 27. A pressure connection 46 denoted P1 is also provided on the docking device 27 for supplying compressed air to the docking device 27.

The clamping device 23 can be actuated into a release position via the first coupling element 26, marked X1. The clamping force of the clamping device 23 acted upon by a spring 47 in the clamped position can be increased via the second coupling element 26, marked X2. The blowing device 43 for blowing off swarf or other contaminants can be supplied via the third coupling element 26 designated X3. When the docking device 27 is coupled to the zero-point clamping system 1, the clamping device 23 can be moved into the released position by the first switching valve 45, marked S1. On the other hand, the clamping force of the clamping device 23 acted upon by the spring 47 in the clamped position can be increased by the second switching valve 45, marked S2. By means of the self-locking valve 44, upstream of the clamping device 23, it can be ensured that the clamping device 23 remains open during unloading and only closes when the counterpressure is actively controlled. The third switching valve 45, designated S3, can be used to control the blowing device 43. The fourth switching valve 45, designated S4, can be used to retract the pressure ram 37 of the docking elements 28 in order to facilitate decoupling of the gripping and positioning device 3.

With the clamping device described above, a machine vice 2 can be transported to the zero-point clamping system 1 fastened to a clamping support 5 via the gripping and positioning device 3 from a provisioning station, as shown in FIG. 1. The clamping device 23 arranged in the zero-point clamping system 1 is designed in such a way that it can be clamped by spring force and released by control with compressed air or its clamping force increased. The self-locking valve 44 is then integrated in the zero-point clamping system 1, which keeps the clamping device 23 open until an active counterpressure is adjusted by the compressed air. Compressed air need only be introduced to the zero-point clamping system 1 when the machine vice 2, which is transported by the gripping and positioning device 3, is retracted with its pin-shaped zero-point clamping element 18 into the corresponding receiving opening 19 of the zero-point clamping system 1. The pin-shaped zero-point clamping element 18 specifies the precise position of the machine vice 2. The clamped and released state of the clamping device 23 can be detected by an appropriate sensor mechanism to avoid damage. This prevents the machine vice 2 from being coupled to or removed from the zero-point clamping system 1 by the gripping and positioning device 3 when the clamping device 23 is closed.

Figure 9:
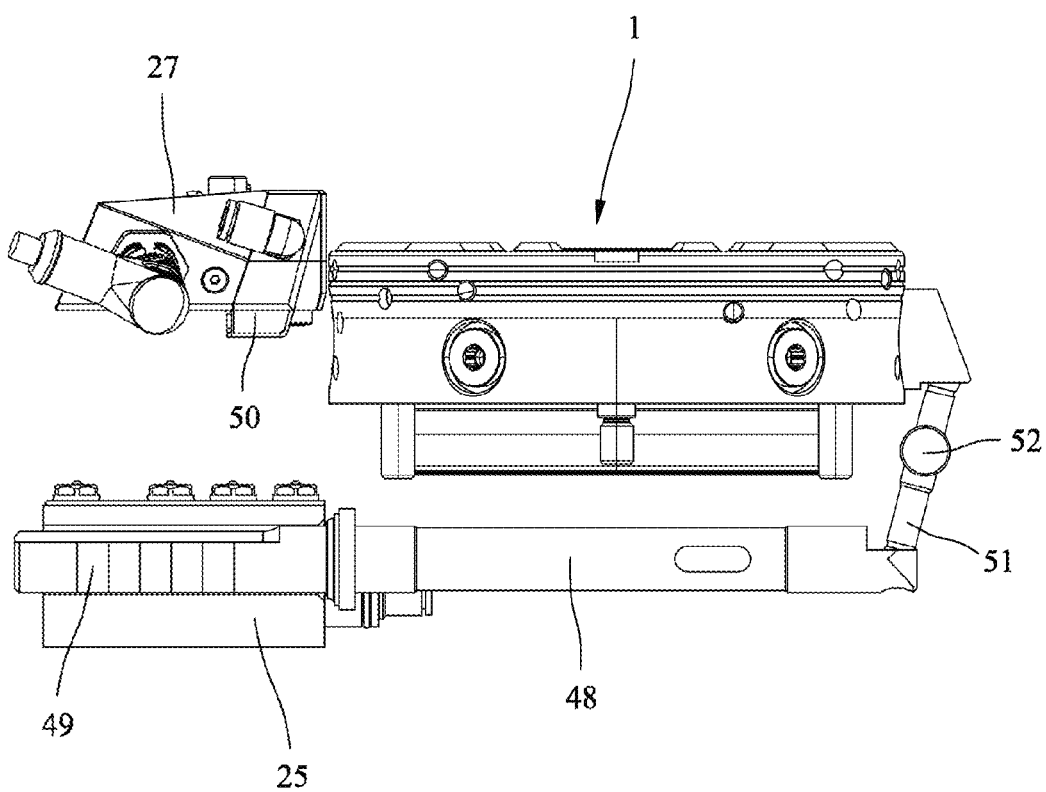

Monitoring of the switching state of the zero-point clamping system 1 can be performed, for example, via a sensor mechanism, shown in FIG. 9. The sensor mechanism has a push rod 48 connected to the clamping device 23 in the zero-point clamping system with switch 49 and a sensor 50 arranged on the docking device 27. The switch actuators 49 can be arranged with the spacing dimension of the different vices in such a way that a switch actuator 49 is available for monitoring for all possible vices. The push rod 48 is connected to the clamping device 23 integrated in the zero-point clamping system 1 via an articulated coupling provided with a transfer lever 51 and a joint 52. Movement of the clamping device 23 can therefore be amplified. The sensor 50 can expediently be a laser sensor. However, monitoring can also occur by ultrasound or radar sensors or other inductive, capacitive, or similar sensors. The sensor signals can also be transmitted, for example, via Bluetooth or a similar wireless method from the zero-point clamping system 1 to the docking device 27 for controlling the compressed air.

During loading of the zero-point clamping system 1 with a machine vice 2, the pressure rams 37 shown in FIG. 7 are pressed downward by springs 39. As soon as the pin-shaped zero-point clamping element 18 is correctly introduced into the receiving opening 19 and the machine vice 2 lies on the flat contact surfaces 24, the pressure rams 37 contact the connecting parts 31 of the coupling elements 26 arranged on the zero-point clamping system 1. Compressed air supply to the zero-point clamping system 1 can then be controlled by the switching valves 45 and the clamping device 23 actuated for clamping.

After clamping of the machine vice 2 on the zero-point clamping system 1, the gripping and positioning device 3 can be decoupled from the machine vice 2, in which case the compressed air can still be advantageously utilized here in order to also withdraw the pressure rams 37 and thus create free space for lateral separation movement of the gripping and positioning unit 3. For this purpose, the pressure rams 37 shown in FIG. 7 can have a first pressure surface 53 acted upon with compressed air by opening of the switching valve S4 for movement of the pressure ram 37 into a retracted position. The pressure rams 37 in the embodiment shown are designed as differential pressure rams, which, in addition to the annular first pressure surface 53, have a smaller second pressure surface 54 relative to the first pressure surface 53, acted upon by compressed air. The pressure rams 37 can therefore not only be withdrawn via the compressed air, but also forced against the coupling elements 26.

To remove the machine vice 2 from the zero-point clamping system 1, the gripping and positioning device 3 is positioned with the docking device 27 at the corresponding coupling elements 26 of the zero-point clamping system 1. The fourth switching valve 45, designated S4, is closed so that the pressure rams 37 of the docking elements 28 are extended and can come into contact with the coupling elements 26 of the zero-point clamping system 1. By corresponding actuation of the first switching valve 45, designated S1, the clamping device 23 can then be controlled for opening. The opening of the clamping device 23 is detected by a corresponding sensor mechanism. The opening pressure within the zero-point clamping system 1 is maintained by the self-locking valve 44 until the self-locking valve 44, which is designed as a return valve, is opened and the clamping device 23 can close.

LIST OF REFERENCE NUMBERS

1 Zero-point clamping system
2 Machine vice
3 Gripping and positioning device
4 Support arm
5 Clamping carrier
6 Clamping jaw
7 Clamping jaw
8 Base element
9 Slide
10 Slide
11 Adjustment element
12 Coupling profile
13 Rotary drive
14 Coupling piece
15 Coupling unit
16 RFID write/read head
17 Underside
18 Zero-point clamping element
19 Receiving opening
20 Longitudinal axis
21 Base plate
22 Housing
23 Clamping device
24 Flat contact surface
25 Connection unit
26 Coupling element 27 Docking device
28 Docking element
29 Channel
30 Line
31 Connection part
32 Through-opening
33 Compression spring
34 Blocking element
35 Longitudinal axis
36 Receiving hole
37 Pressure ram
38 Through-opening
39 Spring
40 Pressure piece
41 Passage
42 Seal
43 Blowing device
44 Self-locking valve
45 Switching valve
46 Pressure connection
47 Spring
48 Push rod
49 Switch actuator
50 Sensor
51 Transfer lever
52 Joint
53 First pressure surface
54 Second pressure surface

The invention claimed is:

1. A clamping device comprising a zero-point clamping system which is actuatable by a working medium, a machine vice which is coupleable to the zero-point clamping system, and a gripping and positioning device for transporting and positioning the machine vice on the zero-point clamping system, wherein the zero-point clamping system includes at least one coupling element and the gripping and positioning device includes a docking device having at least one docking element which is coupleable to the at least one coupling element for supplying the working medium to the zero-point clamping system, wherein the at least one coupling element on the zero-point clamping system is offset parallel to a receiving opening for a clamping element located on the machine vice, and wherein the at least one docking element is arranged in such a way that the at least one docking element is coupled to the at least one coupling element by a retracting movement of the clamping element located on the machine vice into the receiving opening.

2. The clamping device according to claim 1, wherein the at least one coupling element has a through-opening, the longitudinal axis of the through-opening runs parallel to a longitudinal axis of the receiving opening for the clamping element.

3. The clamping device according to claim 2, wherein the at least one docking element includes a pressure ram axially displaceable in a receiving opening of the docking device and wherein the pressure ram is provided with a through-opening.

4. The clamping device according to claim 3, wherein the pressure ram is arranged in such a way that the through-opening of the pressure ram is aligned with the through-opening of the corresponding coupling element when the gripping and positioning device assumes a docking position for docking the machine vice onto the zero-point clamping system.

5. The clamping device according to claim 3, wherein the pressure ram is pressed outward by a compression spring.

6. The clamping device according to claim 3, wherein an outer end facing the coupling element of the pressure ram contains a central pressure part for opening a blocking element arranged in the through-opening of the at least one coupling element and a passage for conveying compressed air from the docking element to the coupling element.

7. The clamping device according to claim 6, wherein the blocking element is a blocking pin guided to move within the coupling element and forced into a closed position by a compression spring.

8. The clamping device according to claim 3, wherein the pressure ram contains a first pressure surface that can be acted upon by the working medium to move the pressure ram into a retracted position.

9. The clamping device according to claim 8, wherein the pressure ram is designed as a differential pressure ram, which, in addition to the first pressure surface (that can be acted upon by the working medium to move pressure ram into a retracted position, contains a second pressure surface that can be acted upon by the working medium to force the pressure ram into an extended position.

10. The clamping device according to claim 1, wherein a plurality of switching valves are arranged in the docking device for controlling the supply of compressed air.

11. The clamping device according to claim 1, wherein a self-locking valve is arranged in the zero-point clamping system for holding the zero-point clamping system in an open position in the absence of actuation in a closed position.

12. The clamping device according to claim 1, wherein a plurality of rows of coupling elements arranged side by side are arranged on the zero-point clamping system and a plurality of docking elements arranged side by side are arranged on the gripping and positioning device for coupling to the corresponding coupling elements of each row.

13. The clamping device according to claim 1, wherein the gripping and positioning device contains an integrated drive for moving the clamping device between a clamping and a release position.

14. The clamping device according to claim 1, wherein a sensor mechanism is assigned to the zero-point clamping system for monitoring the switching state of the zero-point clamping system.

15. The clamping device according to claim 14, wherein the sensor mechanism has a push rod connected to a clamping device in the zero-point clamping system with switch actuators and a sensor arranged on the docking device.

16. The clamping device according to claim 15, wherein the push rod is connected to the clamping device in the zero-point clamping system via an articulated coupling provided with a transfer lever and a joint.

* * * * *